United States Patent [19]

Nakagawa et al.

[11] Patent Number: 4,786,665

[45] Date of Patent: Nov. 22, 1988

[54] **CHLOROSULFONATED ETHYLENE.
α-OLEFIN COPOLYMER COMPOSITION
CONTAINING HYDROTALCITE**

[75] Inventors: Tatsushi Nakagawa; Yoshiaki Ishida; Junichiro Kanesaka; Yosuke Kaneshige, all of Yamaguchi, Japan

[73] Assignee: Tosoh Corporation, Yamaguchi, Japan

[21] Appl. No.: 170,198

[22] Filed: Mar. 18, 1988

[51] Int. Cl.$^4$ .................................................. C08K 3/26
[52] U.S. Cl. ....................................... 524/424; 524/202; 524/570; 524/576; 524/579
[58] Field of Search ............... 524/424, 579, 576, 570, 524/202

[56] References Cited

U.S. PATENT DOCUMENTS

| | | | |
|---|---|---|---|
| 4,085,088 | 4/1978 | Miyata et al. | 524/436 |
| 4,558,102 | 12/1985 | Miyata | 524/424 |
| 4,675,356 | 6/1987 | Miyata | 524/424 |
| 4,704,423 | 11/1987 | Iwanami et al. | 524/424 |

Primary Examiner—Herbert J. Lilling
Attorney, Agent, or Firm—Sughrue, Mion, Zinn, Macpeak & Seas

[57] ABSTRACT

A chlorosulfonated ethylene.α-olefin copolymer composition is disclosed, comprising
(a) 100 parts by weight of a chlorosulfonated ethylene.α-olefin copolymer containing from 25 to 32% by weight chlorine and from 0.3 to 2.5% by weight sulfur,
(b) from 10 to 35 parts by weight of a hydrotalcite,
(c) from 0.5 to 5 parts by weight of a thiuram, and
(d) from 0.5 to 5 parts by weight of a maleimide.

The chlorosulfonated ethylene.α-olefin copolymer of the invention provides vulcanized products having excellent heat resistance, cold resistance and water resistance.

5 Claims, No Drawings

100
CHLOROSULFONATED ETHYLENE. α-OLEFIN COPOLYMER COMPOSITION CONTAINING HYDROTALCITE

FIELD OF THE INVENTION

This invention relates to a chlorosulfonated ethylene.α-olefin copolymer composition. More particularly, the invention relates to a chlorosulfonated ethylene.α-olefin copolymer composition more excellent in heat resistance, cold resistance and water resistance of the product thereof after vulcanization.

The chlorosulfonated copolymer composition of this invention is particularly useful in the field of rubber belts such as toothed rubber belts, poly-V-belts, etc.

BACKGROUND OF THE INVENTION

A chlorosulfonated polymer typified by chlorosulfonated polyethylene has properties similar to those of chloroprene rubber.

However, since the chlorosulfonated polymer is excellent in heat resistance, weather resistance, and ozone resistance as compared with chloroprene rubber, the chlorosulfonated polymer is frequently used as a polymer having more excellent heat resistance.

Accordingly, in the field wherein the heat resistance of conventional chloroprene rubber is yet insufficient, it has been attempted to replace the chloroprene rubber with a chlorosulfonated polymer.

For example, there are rubber belts such as toothed belts and poly-V-belts made of such a chlorosulfonated polymer.

However, since chlorosulfonated polyethylene is inferior in cold resistance as compared with chloroprene rubber, it is sometimes difficult to clear the problem of the cold resistance required for toothed belt.

On the other hand, in the field of toothed rubber belt, it is the most important technical theme to improve the water resistance of the product in addition to the aforesaid heat resistance and cold resistance thereof.

It is known that for improving the heat resistance and water resistance of the vulcanized product of chlorosulfonated polyethylene, the use of lead compound such as litharge, red lead oxide, etc., as an acid-acceptor is effective. However, the use of such a lead compound is undesirable because of the problem of environmental pollution by toxicity of the lead compound.

SUMMARY OF THE INVENTION

As the result of various investigations for obtaining vulcanized products having more excellent heat resistance, cold resistance, and water resistance under the aforesaid circumstances, the inventors have succeeded in attaining the present invention.

An object of this invention is, therefore, to provide a chlorosulfonated ethylene.α-olefin copolymer composition more excellent in heat resistance, cold resistance, and water resistance of the product thereof after vulcanization.

The chlorosulfonated copolymer composition of this invention is particularly effective as a composition for rubber belts such as toothed belts, poly-V-belts, etc.

That is, the invention is concerned with a chlorosulfonated ethylene.α-olefin copolymer composition comprising (a) 100 parts by weight of a chlorosulfonated ethylene.α-olefin copolymer containing from 25 to 32% by weight chlorine and from 0.3 to 2.5% by weight sulfur, (b) from 10 to 35 parts by weight of a hydrotalcite, (c) from 0.5 to 5 parts by weight of a thiuram, and (d) from 0.5 to 5 parts by weight of a maleimide.

DETAILED DESCRIPTION OF THE INVENTION

For obtaining vulcanized products excellent in heat resistance, cold resistance, and water resistance in this invention, it is important to use a specific combination of the specific components described above.

That is, the chlorosulfonated ethylene.α-olefin copolymer composition contains components (a), (b), (c), and (d) described above as indispensable components.

The chlorosulfonated ethylene.α-olefin copolymer is generally a product obtained by chlorinating and chlorosulfonating an ethylene.α-olefin copolymer as the the raw material.

As the ethylene.α-olefin copolymer, there are, for example, an ethylene.butene-1 copolymer, an ethylene.-propylene copolymer, and ethylene.hexene-1 copolymer, an ethylene.octene-1 copolymer, and an ethylene.4-methylpentene-1 copolymer.

In the copolymer, the ratio of ethylene/α-olefin is desirably from 98/2 to 60/40.

If the ratio is outside the aforesaid range, the desired cold resistance becomes unobtainable.

A particularly preferred ethylene.α-olefin copolymer is a copolymer of ethylene and butene-1 having an ethylene/butene-1 ratio in the range of from 95/5 to 70/30.

If the composition of ethylene and α-olefin as the raw materials for the copolymer is once selected, the composition of ethylene and α-olefin is kept as it is in the chlorosulfonated ethylene.α-olefin copolymer obtained by chlorinating and chlorosulfonating the copolymer.

On the other hand, the mole ratio of ethylene and butene-1 may be expressed by the number of ethyl groups per 1,000 carbon atoms. That is, the component ratio of a composition having an ethylene/butene-1 ratio of from 98/2 to 60/40 may be expressed as from 10 to 200 ethyl groups per 1,000 carbon atoms.

The content of chlorine contained in the chlorosulfonated ethylene.α-olefin copolymer is preferably from 25 to 32% by weight.

If the chlorine content is less than 25% by weight or over 32% by weight, the desired cold resistance is unobtainable for the copolymer composition. A particularly preferred chlorine content is from 28 to 31% by weight.

The content of sulfur contained in the chlorosulfonated ethylene.α-olefin copolymer is a measure of showing the content of the group shown by —SO$_2$Cl acting as crosslinking sites and is preferably from 0.3 to 2.5% by weight, more preferably from 0.5 to 1.5% by weight.

For synthesizing the chlorosulfonated ethylene.α-olefin copolymer, a method of reacting an ethylene.α-olefin copolymer as the raw material with chlorine and sulfur dioxide, chlorine and sulfuryl chloride or sulfuryl chloride alone using a radical generating agent as a catalyst is generally employed.

For performing the aforesaid reaction, there are a homogeneous system of performing the reaction in a solution of the reactants, a heterogeneous system of performing the reaction in a suspension, and a heterogeneous system of performing the reaction in a gaseous phase. The homogeneous system of performing the reaction in a solution of an ethylene.α-olefin copolymer as a raw material dissolved in a solvent gives the chlorosulfonated ethylene.α-olefin copolymer excellent in both the heat resistance and cold resistance and, hence, is preferably used in this invention.

In this case, a solvent inert to the halogenation reaction, such as carbon tetrachloride, chloroform, monochlorobenzene, tetrachloroethane, etc., is used as the solvent.

The chlorosulfonated copolymer composition of this invention is obtained by adding (b) from 10 to 35 parts by weight of a hydrotalcite, (c) from 0.5 to 5 parts by weight of a thiuram, and (d) from 0.5 to 5 parts by weight of a maleimide to (a) 100 parts by weight of the chlorosulfonated ethylene.α-olefin copolymer containing from 25 to 32% by weight chlorine and from 0.3 to 2.5% by weight sulfur.

A hydrotalcite includes hydrotalcite produced as a natural mineral in the Ural district of the Soviet Union and synthetic hydrotalcites industrially synthesized.

As synthetic hydrotalcites, there are, for example, there are DHT-4A-2, DHT-4A, KW-2100, and KW-2200 (made by Kyowa Kogyo Co., Ltd.).

The hydrotalcite is added as an acid-acceptor for the chlorosulfonated polymer and shows very excellent heat resistance, cold resistance, and water resistance in a specific composition according to the invention.

The addition amount of the hydrotalcite is from 10 to 35 parts by weight. If the amount is less than 10 parts by weight, the desired water resisting and heat resisting effects cannot be expected. On the other hand, if the amount is over 35 parts by weight, large faults such as an increase in viscosity of the composition and an increase in hardness of the vulcanized product occur.

The addition amount thereof is more preferably from 13 to 23 parts by weight for giving good balance of heat resistance and water resistance and excellent workability.

A thiuram is generally known as a vulcanization accelerator. Examples thereof are dipentamethylenethiuram tetrasulfide (TRA), tetramethylthiuram monosulfide (TS), tetramethylthiuram disulfide (TT or TMTD), and tetraethylthiuram disulfide (TET).

The thiuram is used in an amount of from 0.5 to 5 parts by weight. If the amount is less than the aforesaid range, the vulcanization speed and the vulcanization density are not increased, while if the amount is larger than the range, the water resistance is reduced. The amount thereof is preferably from 1 to 3 parts by weight.

A maleimide is used as a vulcanization accelerator or an antioxidant, and an example thereof is N,N'-m-phenylenediaminedimaleimide. The maleimide is also commercially available as Vulnoc ® PM or HVA-2.

The maleimide is used in an amount of from 0.5 to 5 parts by weight and is preferably from 1 to 3 parts by weight for increasing the heat resistance.

The chlorofulfonated ethylene.α-olefin copolymer composition according to the present invention may further contain (e) from 0.2 to 4 parts by weight of a dithiocarbamic acid salt. The addition of the dithiocarbamic acid salt can further improve the heat resistance. If the addition amount of the dithiocarbamic acid salt is less than 0.2 part by weight, an improving effect in heat resistance is not remarkable, whereas if it is over 4 parts by weight, no further improving effect in heat resistance is expected. The addition amount of the dithiocarbamic acid salt is preferably from 0.3 to 3 parts by weight, more preferably from 0.5 to 2 parts by weight.

Examples of the dithiocarbamic acid salt include nickel dibutyldithiocarbamate (NBC), nickel diethyldithiocarbamate (NEC), zinc dibuthyldithiocarbamate, zinc diethyldithiocarbamate, etc. Particularly preferred is nickel dibutyldithiocarbamate (NBC).

In a specified composition of the present invention, the addition of the dithiocarbamic acid salt is quite effective in improving the heat resistance.

That is, when allowed to stand at high temperatures, the vulcanized product is less in change of elongation and small in compression set at high temperatures. This is because the dithiocarbamic acid salt directly acts on the vulcanization mechanism of the chlorosulfonated ethylene.α-olefin copolymer in a specific vulcanization system according to the present invention.

The chlorosulfonated ethylene.α-olefin copolymer is vulcanized by the co-action of the hydrotalcite, the thiuram, the maleimide, and optionally, the dithiocarbamic acid salt.

The vulcanization mechanism has not yet been clarified, but the important matter in this invention is that the aforesaid object can be attained by a specific combination in this invention.

The polymer composition of this invention may, if necessary, further contain other ordinary rubber compounding ingredients such as a reinforcing agent, a filler, a plasticizer, an antioxidant, a processing aid, etc., in addition to aforesaid indispensable components (a), (b), (c), (d), and optionally, (e).

As the reinforcing agent and filler, there are, for example, carbon black, white carbon, calcium carbonate, clay, talc, and titanium oxide.

As the plasticizer, there are, for example, various oils, esters, and chlorinated paraffins.

As the antioxidant, there are, for example, amine compounds and phenolic compounds.

As the processing aid, there are, for example, low molecular weight polyethylene and metal soaps.

In addition, as described above, in this invention, the aforesaid object can be attained by the proper vulcanization of a chlorosulfonated ethylene.α-olefin copolymer. Therefore, in the case of using materials directly giving influences on the vulcanization, such as a vulcanizing agent and a vulcanization accelerator together with the aforesaid indispensable components in this invention, the addition amount, the kind, etc., thereof must be carefully selected. For example, when a vulcanizing agent or a vulcanization accelerator is used together with the aforesaid components, the addition amount thereof must be less than 3 parts by weight.

The chlorosulfonated copolymer composition of this invention is obtained by compounding the aforesaid components by an internal mixer such as a Banbury mixer and an inter mixer or an ordinary rubber mixer such as an open roll mill, etc.

The composition thus obtained is vulcanized by press vulcanization, steam vulcanization, ultra high frequency (UHF) vulcanization, hot air vulcanization, etc., to provide vulcanized products.

The following examples are intended to illustrate the present invention more practically but not to limit it in any way.

In addition, the values used in these examples were obtained according to the following measurement methods.

Mole ratio of ethylene to butene-1: Analyzed by $^{13}$C-NMR (nuclear magnetic resonance)
Melt index: JIS K 7210
Density: JIS K 7112
Mooney viscosity (ML$_{1+4}$, 100° C.): JIS K 6300
Vulcanized rubber properties: JIS K 6301.

In addition, the chlorosulfonated ethylene.butene-1 copolymers used in these examples were prepared as follows.

Chlorofulfonated copolymer used in Examples 1–4 & 7–9 and Comparison Examples 1–3

After dissolving 3360 g of an ethylene-butene-1 copolymer (melt index: 4 g/10 min., density: 0.89 g/cc) composed of 91.7 mole % ethylene and 8.3 mole % butene-1 in carbon tetrachloride, the copolymer was reacted with 5620 g of sulfuryl chloride with the addition of 12 g of α,α'-azobisisobutyronitrile as a radical generating agent and 0.25 g of pyridine as a promoter.

After the reaction was over, acid components remaining in the solution were removed, and then 17 g of 2,2'-bis(4-glycidyloxyphenyl)propane was added thereto. Then, the solution was fed to a drum dryer by an ordinary manner to separate the product from the solvent.

The result of the analysis of the chlorosulfonated ethylene.butene-1 copolymer thus obtained showed that the product contained 30.1% by weight of chlorine and 1.02% by weight sulfur. The Mooney viscosity (ML$_{1+4}$, 100° C.) was 58. The chlorosulfonated copolymer was defined as A-1.

Chlorosulfonated copolymer used in Example 5

By following the same procedure as above except that the following ethylene.utene-1 copolymer was used as the raw material, a chlorosulfonated copolymer was obtained.

Ethylene.butene-1 copolymer:
Ratio of ethylene/butene-1: 92.3/7.7
Melt index: 3 g/10 min.
Density: 0.89 g/cc.

The result of the analysis of the chlorosulfonated ethylene.butene-1 copolymer thus obtained showed that the copolymer contained 30.0% by weight of chlorine and 0.99% by weight sulfur. The Mooney viscosity (ML$_{1+4}$, 100° C.) thereof was 65. The chlorosulfonated copolymer was defined as A-2.

Chlorosulfonated copolymer used in Example 6

By following the same procedure as above except that the following ethylene-butene-1 copolymer was used as the raw material, a chlorosulfonated copolymer was obtained.

Ethylene.butene-1 copolymer:
Ratio of ethylene/butene-1: 92.3/7.7
Melt index: 8 g/10 min.
Density: 0.89 g/cc.

The result of the analysis of the chlorosulfonated ethylene-butene-1 copolymer thus obtained showed that the copolymer contained 30.0% by weight of chlorine and 1.01% by weight sulfur. The Mooney viscosity (ML$_{1+4}$, 100° C.) was 44. The chlorosulfonated copolymer was defined as A-3.

EXAMPLES 1 TO 6 AND COMPARISON EXAMPLES 1 TO 4

The compounding ingredients shown in Table 1 below were kneaded by means of an open roll mill and then vulcanized for 40 minutes at 150° C. to provide each vulcanized sheet.

Thereafter, the properties of the vulcanized products were measured, and the results obtained are shown in Table 1. In addition, for determining the cold resistance of each product, a Gehman torsion test was used.

TABLE 1

| | Example 1 | Example 2 | Example 3 | Example 4 | Example 5 | Example 6 | Comparison Example 1 | Comparison Example 2 | Comparison Example 3 | Comparison Example 4 |
|---|---|---|---|---|---|---|---|---|---|---|
| Components: | | | | | | | | | | |
| A-1*[1] | 100 | 100 | 100 | 100 | | | 100 | 100 | 100 | |
| A-2*[1] | | | | | 100 | | | | | |
| A-3*[1] | | | | | | 100 | | | | |
| Hypalon ® 40*[2] | | | | | | | | | | 100 |
| Hydrotalcite DHT-4A-2*[3] | 15 | 20 | | | 15 | 15 | | 5 | 15 | 15 |
| Hydrotalcite KW-2100*[3] | | | 15 | 20 | | | | | | |
| Magnesia | | | | | | | 5 | | | |
| SRF carbon black | 35 | 35 | 35 | 35 | 35 | 35 | 35 | 35 | 35 | 35 |
| Dioctyl sebacate (DOS) | 8 | 8 | 8 | 8 | 8 | 8 | 8 | 8 | 8 | 8 |
| Suntight ® | 2 | 2 | 2 | 2 | 2 | 2 | 2 | 2 | 2 | 2 |
| Accelerator TRA | 2 | 2 | 2 | 2 | 2 | 2 | 2 | 2 | 2 | 2 |
| Accelerator PM | 2 | 2 | 2 | 2 | 2 | 2 | 2 | 2 | | 2 |
| Vulcanization Characteristics: | | | | | | | | | | |
| Tensile Properties | | | | | | | | | | |
| H$_S$ (JIS A) | 67 | 69 | 69 | 72 | 67 | 66 | 66 | 65 | 67 | 67 |
| T$_B$ (kg/cm$^2$) | 224 | 221 | 216 | 211 | 225 | 217 | 199 | 196 | 213 | 205 |
| E$_B$ (%) | 310 | 300 | 300 | 290 | 300 | 330 | 370 | 350 | 300 | 290 |
| M$_{100}$ (kg/cm$^2$) | 33 | 37 | 61 | 68 | 34 | 31 | 39 | 53 | 40 | 37 |
| Heat Resistance | | | | | | | | | | |
| ΔE$_B$ (%)*[4] | −18 | −23 | −15 | −20 | −18 | −19 | −29 | −22 | −31 | −18 |
| C-Set (%)*[5] | 70 | 69 | 75 | 72 | 70 | 72 | 81 | 83 | 91 | 71 |
| Water Resistance | | | | | | | | | | |
| ΔV (%)*[6] | 5.9 | 4.5 | 5.0 | 5.3 | 5.8 | 5.9 | 29.5 | 22.3 | 6.6 | 5.7 |
| Gehman Torsion Test | | | | | | | | | | |
| T$_2$ (°C.) | −20 | −19 | −24 | −23 | −20 | −21 | −19 | −21 | −20 | −11 |
| T$_5$ (°C.) | −27 | −26 | −28 | −28 | −26 | −28 | −26 | −28 | −27 | −18 |

TABLE 1-continued

|  | Example 1 | Example 2 | Example 3 | Example 4 | Example 5 | Example 6 | Comparison Example 1 | Comparison Example 2 | Comparison Example 3 | Comparison Example 4 |
|---|---|---|---|---|---|---|---|---|---|---|
| $T_{10}$ (°C.) | −31 | −31 | −31 | −31 | −30 | −32 | −29 | −32 | −31 | −22 |
| $T_{100}$ (°C.) | −36 | −36 | −37 | −36 | −35 | −36 | −35 | −36 | −36 | −30 |

*[1] Chlorosulfonated ethylene.α-olefin copolymer
*[2] Chlorosulfonated polyethylene, made by E. I. Du Pont
*[3] Produced by Kyowa Kagaku Kogyo K.K.
*[4] Change of elongation after 70 hours at 120° C.
*[5] Compression set after 22 hours at 120° C.
*[6] Volume change after 8 hours in boiling water

EXAMPLES 7 TO 9

The compounding ingredients shown in Table 2 below were kneaded by means of an open roll mill and then vulcanized for 30 minutes at 150° C. to provide vulcanized sheets.

Thereafter, the properties of the vulcanized products were measured, and the results obtained are shown in Table 2. In addition, for determining the cold resistance of each product, a Gehman torsion test was used.

TABLE 2

|  | Example 7 | Example 8 | Example 9 |
|---|---|---|---|
| Components: |  |  |  |
| A-1*[1] | 100 | 100 | 100 |
| Hypalon ® 40*[2] |  |  |  |
| Hydrotalcite DHT-4A-2*[3] | 20 | 20 | 20 |
| Magnesia |  |  |  |
| SRF carbon black | 35 | 35 | 35 |
| Dioctyl sebacate (DOS) | 8 | 8 | 8 |
| Suntight ® | 2 | 2 | 2 |
| Accelerator TRA | 1 | 1 | 1 |
| Accelerator PM | 2 | 1.5 | 1.5 |
| NBC | 1 | 0.5 | 1 |
| Vulcanization Characteristics |  |  |  |
| Tensile Properties |  |  |  |
| $H_S$ (JIS A) | 72 | 71 | 72 |
| $T_B$ (kg/cm$^2$) | 206 | 212 | 209 |
| $E_B$ (%) | 290 | 320 | 300 |
| $M_{100}$ (kg/cm$^2$) | 61 | 55 | 59 |
| Heat Resistance |  |  |  |
| $\Delta E_B$ (%)*[4] | −13 | −14 | −13 |
| C-Set (%)*[5] | 30 | 38 | 33 |
| Water Resistance |  |  |  |
| $\Delta V$ (%)*[6] | 5.2 | 5.7 | 5.5 |
| Gehman Torsion Test |  |  |  |
| $T_2$ (°C.) | −19 | −20 | −19 |
| $T_5$ (°C.) | −26 | −27 | −27 |
| $T_{10}$ (°C.) | −31 | −31 | −31 |
| $T_{100}$ (°C.) | −36 | −36 | −36 |

*[1] Chlorosulfonated ethylene.α-olefin copolymer
*[2] Chlorosulfonated polyethylene, made by E. I. Du Pont
*[3] Produced by Kyowa Kagaku Kogyo K.K.
*[4] Change of elongation after 70 hours at 120° C.
*[5] Compression set after 22 hours at 120° C.
*[6] Volume change after 8 hours in boiling water As shown in Table 1, the chlorosulfonated ethylene.α-olefin copolymer compositions in Examples 1 to 6 of this invention give vulcanized products having excellent heat resistance, cold resistance, and water resistance.

On the other hand, the chlorosulfonated copolymer composition using magnesia as a vulcanizing agent without using a hydrotalcite in Comparison Example 1 gives the vulcanized product without having desired water resistance. Also, the chlorosulfonated copolymer composition in Comparison Example 2 gives the vulcanized product thereof without having desired water resistance due to the less amount of the hydrotalcite. Furthermore, the chlorosulfonated copolymer composition without using a maleimide in Comparison Example 3 gives the vulcanized product inferior in heat resistance. Also, the chlorosulfonated copolymer composition in Comparison Example 4 using Hypalon ® 40 (chlorosulfonated polyethylene) in place of a chlorosulfonated ethylene.α-olefin copolymer gives the vulcanized product without having desired cold resistance.

Further, the chlorosulfonated ofethylene.α-olefin copolymer compositions in Examples 7 to 9 of this invention give vulcanized products having excellent heat resistance, cold resistance, and water resistance, particularly excellent heat resistance.

Thus, it is clear from these examples and comparison examples that the chlorosulfonated ethylene.α-olefin copolymer composition of this invention can provide a vulcanized product thereof excellent in heat resistance, cold resistance, and water resistance.

The chlorosulfonated copolymer composition of this invention is thus particularly useful as materials for making rubber belts such as toothed belts, poly-V-belts, etc.

Furthermore, the chlorosulfonated copolymer composition of this invention can be also applied in other fields of requiring heat resistance, cold resistance, and water resistance, such as sheets, coating materials for cables, hoses, etc.

While the invention has been described in detail and with reference to specific embodiments thereof, it will be apparent to one skilled in the art that various changes and modifications can be made therein without departing from the spirit and scope thereof.

What is claimed is:

1. A chlorosulfonated ethylene.α-olefin copolymer composition comprising
    (a) 100 parts by weight of a chlorosulfonated ethylene.α-olefin copolymer containing from 25 to 32% by weight chlorine and from 0.3 to 2.5% by weight sulfur,
    (b) from 10 to 35 parts by weight of a hydrotalcite,
    (c) from 0.5 to 5 parts by weight of a thiuram, and
    (d) from 0.5 to 5 parts by weight of a maleimide.
2. The chlorosulfonated copolymer composition as claimed in claim 1, wherein the chlorosulfonated ethylene.α-olefin copolymer is obtained by chlorinating and chlorosulfonating an ethylene.α-olefin copolymer.
3. The chlorosulfonated copolymer composition as claimed in claim 2, wherein the ratio of ethylene/α-olefin in the ethylene.α-olefin copolymer is from 98/2 to 60/40.
4. The chlorosulfonated copolymer composition as claimed in claim 2, wherein the ethylene.α-olefin copolymer is an ethylene.butene-1 copolymer.
5. The chlorosulfonated copolymer coposition as claimed in claim 1, further comprising (e) from 0.2 to 4 parts by weight of a dithiocarbamic acid salt.

* * * * *